(12) United States Patent
Iwata et al.

(10) Patent No.: US 6,182,350 B1
(45) Date of Patent: Feb. 6, 2001

(54) ELECTRIC MOTOR FOR DRIVING A PISTON PUMP AND METHOD OF ASSEMBLY

(75) Inventors: Masato Iwata, Kiryu; Hiroshi Hagiwara, Isesaki, both of (JP)

(73) Assignee: Mitsuba Corporation, Kiryu (JP)

( * ) Notice: Under 35 U.S.C. 154(b), the term of this patent shall be extended for 0 days.

(21) Appl. No.: 09/119,580

(22) Filed: Jul. 21, 1998

Related U.S. Application Data

(62) Division of application No. 08/884,471, filed on Jun. 27, 1997.

(30) Foreign Application Priority Data

Jun. 28, 1996 (JP) ................................................. 8-188944
Jun. 10, 1997 (JP) ................................................. 9-167970

(51) Int. Cl.[7] .................................................. H02K 15/02
(52) U.S. Cl. .................................................. 29/598
(58) Field of Search ................... 29/598; 310/89, 310/90, 91

(56) References Cited

U.S. PATENT DOCUMENTS

| | | | |
|---|---|---|---|
| 4,994,699 | * | 2/1991 | Shiina ..................................... 310/88 |
| 5,057,730 | * | 10/1991 | Yoshida .................................. 310/91 |
| 5,203,071 | * | 4/1993 | Niemela ................................. 29/596 |
| 5,347,187 | * | 9/1994 | Tsuzaki et al. ................. 310/40 MM |
| 5,564,909 | * | 10/1996 | Rischen et al. ....................... 417/273 |
| 5,620,311 | * | 4/1997 | Wetzel .................................... 417/415 |
| 5,635,778 | * | 6/1997 | Fujita et al. ............................ 310/51 |
| 5,678,299 | * | 10/1997 | Mochizuki et al. .................... 29/596 |
| 5,777,407 | * | 7/1998 | Ishida et al. ............................ 310/64 |
| 5,844,334 | * | 12/1998 | Sasaki et al. ........................... 310/58 |
| 5,854,522 | * | 12/1998 | Iwata et al. ............................. 310/89 |

FOREIGN PATENT DOCUMENTS

| | | | |
|---|---|---|---|
| 2-207184 | * | 8/1990 | (JP) . |
| 5-83372 | * | 11/1993 | (JP) . |
| 6-10471 | * | 2/1994 | (JP) . |
| 7-184344 | * | 7/1995 | (JP) . |

* cited by examiner

*Primary Examiner*—Lee Young
*Assistant Examiner*—Kevin G. Vereene
(74) *Attorney, Agent, or Firm*—Oliff & Berridge, PLC

(57) ABSTRACT

An electric motor for driving a piston pump assembled thereto is disclosed wherein a load from the piston pump acts radially on an armature shaft of the electric motor. The electric motor is assembled such that the outer ring of a yoke bearing is connected to a yoke, and the outer ring of a first pump housing bearing is press fit to a pump housing. One end of the armature shaft is press fit to the yoke bearing inner ring, and the other end of the armature shaft is press fit to the first pump housing bearing inner ring. Thus, wobbling of the armature shaft in the axial and radial directions is minimized or eliminated.

8 Claims, 8 Drawing Sheets

ELECTRIC MOTOR FOR DRIVING A PISTON PUMP AND METHOD OF ASSEMBLY

This is a Division Application Ser. No. 08/884,471 filed Jun. 27, 1997. The entire disclosure of the prior application is hereby incorporated by reference herein in its entirety.

BACKGROUND OF THE INVENTION

1. Field of Invention

This invention relates to the art of electric motors. This invention is specifically concerned with electric motors for driving piston pumps used in anti-locking brake devices for vehicles and the like.

2. Description of Related Art

Generally, examples of electric motors for driving piston pumps of this type include arrangements wherein the piston is caused to move reciprocally in the radial direction with respect to the armature shaft of the driving motor, e.g., arrangements used for anti-locking brakes. An example of such an arrangement is disclosed in Japanese Unexamined patent Publication No. 2-207184. In this arrangement, bearing of the armature shaft is accomplished by a pair of bearings provided at either side of an eccentric shaft linked to the piston side. The armature shaft is press fit to the inner ring of the pair of bearings. The armature shaft is press fit to the bearings when the shaft is aligned with each of the bearings. In the event that the outer rings of the bearings are press fit to the pump housing side, freedom in the radial direction is lost, and in the case that there is misalignment in both of the bearings, press fitting of the armature shaft cannot be performed for all practical purposes. Accordingly, the bearings are arranged so as to be loosely inserted into the pump housing to ensure freedom in the radial direction, however slight, thus handling misalignment.

However, with such an arrangement, not only does wobbling of the bearings in the radial direction due to receiving the load from the piston moving in the aforementioned radial direction cause noise and deterioration of pump performance, but other parts become necessary in order to prevent the bearings (which have been inserted loosely) from moving in the axial direction, requiring extra parts and complicated assembly. Because it is necessary to provide a space for setting a jig for assembling both bearings in a pump housing separately from a space for piston pump components, the resulting space for piston pump components becomes smaller, which creates a problem in that freedom in layout for the piston pump components in a pump housing is reduced.

In order to deal with such problems, an arrangement has been disclosed in Japanese Unexamined patent Publication No. 7-184344, wherein grooves are provided in the bearing outer ring and the member of the pump housing to which the bearing is to be inserted. Resin material is inserted into the aforementioned grooves so as to restrict movement in the axial and radial direction.

However, with such an arrangement, the endurance of the resin material is problematic, and not only is there the possibility that the bearings may return to the original state of being inserted loosely due to deterioration and the like of the resin over prolonged usage periods, but there is the problem that resin material in the grooves decreases work efficiency.

SUMMARY OF THE INVENTION

Accordingly, it is an object of the invention to solve the above-mentioned problems. The invention includes an electric motor which drives a piston pump such that the load from the piston pump side acts upon the armature shaft in a radial direction.

In accordance with a first aspect of the invention, an electric motor for driving a piston pump is disclosed which comprises a yoke including a yoke bearing located at an opening of the yoke, a pump housing connected to the yoke and including a first pump housing bearing located in the pump housing. An armature shaft extends between the yoke bearing and the first pump housing bearing and includes an eccentric shaft tip portion, and a second pump housing bearing, smaller in diameter than the first pump housing bearing, located on the eccentric shaft tip portion of the armature shaft. An inner cylinder portion of the pump housing comprises the sequential formation of a first pump housing bearing support portion by which the first pump housing bearing is supported, a second pump housing bearing moveable support portion which is smaller in diameter than the first pump housing bearing support portion and by which the second pump housing bearing is moveably supported, a temporary supporting portion which is smaller in diameter than the second pump housing bearing moveable support portion and configured to support the second pump housing bearing in a temporarily supported state and an inserting hole portion for inserting a jig from a side of the pump housing that is opposite a side to which the yoke is connected and for pressing the jig against an inner ring of the second pump housing bearing to press fit the inner ring to the eccentric shaft tip portion of the armature shaft.

Such an arrangement allows a small through hole to be placed in the piston housing for passing through a jig for pressing the inner ring of the second pump housing bearing, rather than a through hole corresponding with the outer diameter of the second pump housing bearing for inserting the second pump housing bearing to one side thereof from the other side. While the second pump housing bearing cannot be assembled to the pump housing from the side opposite to the side to which the yoke is assembled, this arrangement is advantageous in that the freedom in layout of the piston pump components provided within the pump housing is improved.

In accordance with a second aspect of the invention, the method of assembly involves the steps of bearing one end of the armature shaft of the electric motor by a yoke with a yoke bearing, bearing the other end of the armature shaft by a pump housing with a first pump housing bearing, press fitting the one end of the armature shaft to an inner ring of the yoke bearing, press fitting the other end of the armature shaft to an inner ring of the first pump housing bearing, press fitting an outer ring of the first pump housing bearing to the pump housing, and assembling an outer ring of the yoke bearing to the yoke.

Such an arrangement does away with axial and radial direction wobbling of the bearings bearing the armature shaft even in the event that load from the piston pump acts upon the armature shaft in the radial direction, thus reducing noise and contributing to improved pump performance.

DETAILED DESCRIPTION OF PREFERRED EMBODIMENTS

Next, the preferred embodiments of the invention will be described with reference to the drawings.

Figure 1:
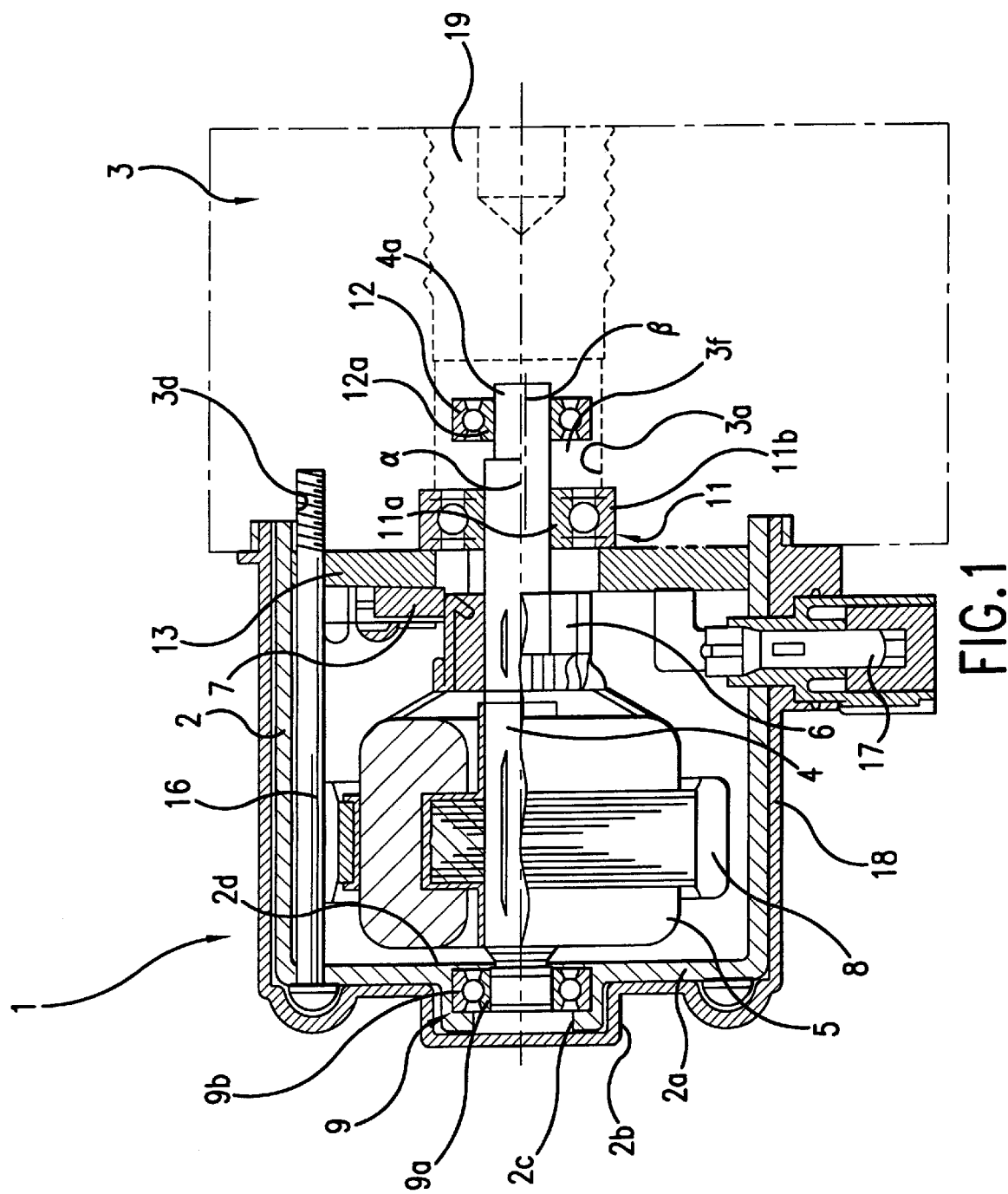
FIG. 1 is a cross-sectional drawing of an electric motor in accordance with a first embodiment of the invention.
Figure 2:
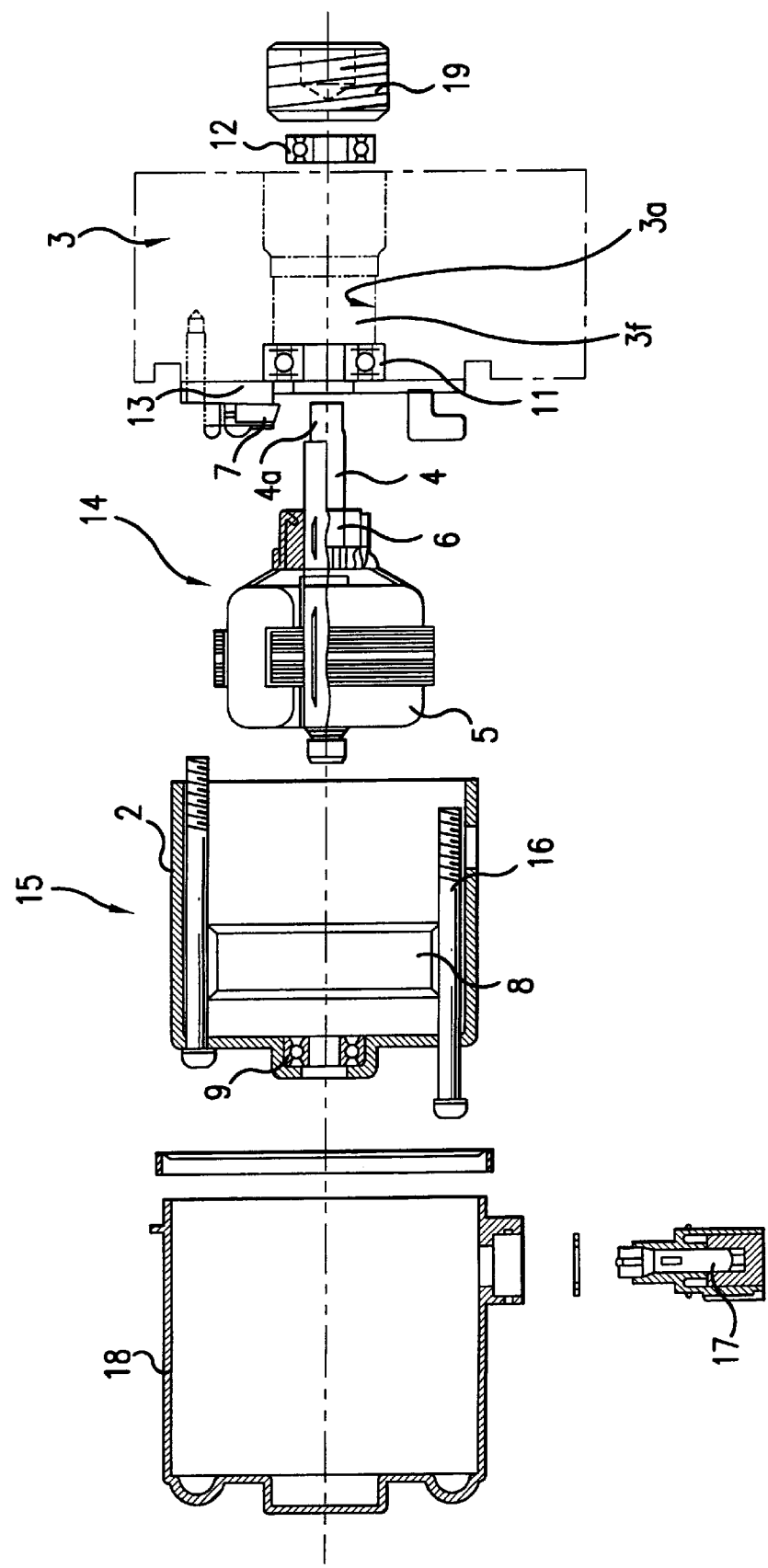
FIG. 2 is a disassembled drawing of an electric motor in accordance with a first embodiment of the invention.

FIG. 1 shows a cross-sectional view of the electric motor for an anti-locking brake device. The electric motor 1 includes an armature shaft 4 rotatably supported on one end by a yoke 2 and on the other end by pump housing 3. An armature core 5 and commutator 6 are assembled integrally to the armature shaft 4. A brush 7 slidably contacts the commutator 6, and a permanent magnet 8 is retained to the inner circumference surface portion of the yoke 2.

The yoke 2 is formed as a cylinder enclosed on the bottom. A bottom cylinder portion 2b is formed to the bottom surface portion 2a thereof, and one end of the armature shaft 4 is rotatably borne by the inner circumference portion of the bottom cylinder portion 2b with a yoke bearing 9. Further, a jig inserting hole 2c, which is greater in diameter than the inner diameter of the yoke bearing 9, is provided at the bottom portion of the bottom cylinder portion 2b. Assembly of the yoke bearing 9 and the armature shaft 4 to this bottom cylinder portion 2b will be described later.

Pump housing 3 is integrally assembled to the opening side of the yoke 2, with an inner cylinder portion 3a formed to the pump housing 3 in a hollow traversing manner to the member coaxial with the shaft center $\alpha$ of the armature shaft 4. The other end of the armature shaft 4 protrudes into the inner cylinder portion 3a. The other side of the armature shaft 4 is also rotatably borne by the pump housing 3 with a first pump housing bearing 11. Assembly of the first pump housing bearing 11 and the armature shaft 4 to the inner cylinder portion 3a will be described later.

The pump housing 3 is mounted to various members comprising the piston pump for an anti-locking brake device, such as a connecting rod, piston, cylinder and the like (all unshown).

An output end of the armature shaft 4 protrudes into the pump housing inner cylinder portion 3a. The output end of the armature shaft 4 protrudes farther into the pump housing 3 than the first pump housing bearing 11 and includes an eccentric output shaft portion 4a, formed with a center shaft $\beta$. The output shaft portion 4a is smaller in diameter and is eccentric as compared to the center shaft $\alpha$ of the armature shaft 4. Assembled to the eccentric output shaft portion 4a is the base end portion of the connecting rod, this being assembled thereto with a second pump housing bearing 12. Further, a piston is connected to the tip portion of the connecting rod. Thus, the structure is arranged such that the rotation of the armature shaft 4 causes the piston to move reciprocally within the cylinder in a radial direction with respect to the armature shaft 4. Thus, the pump is driven and sends pressurized brake oil.

Figure 3:
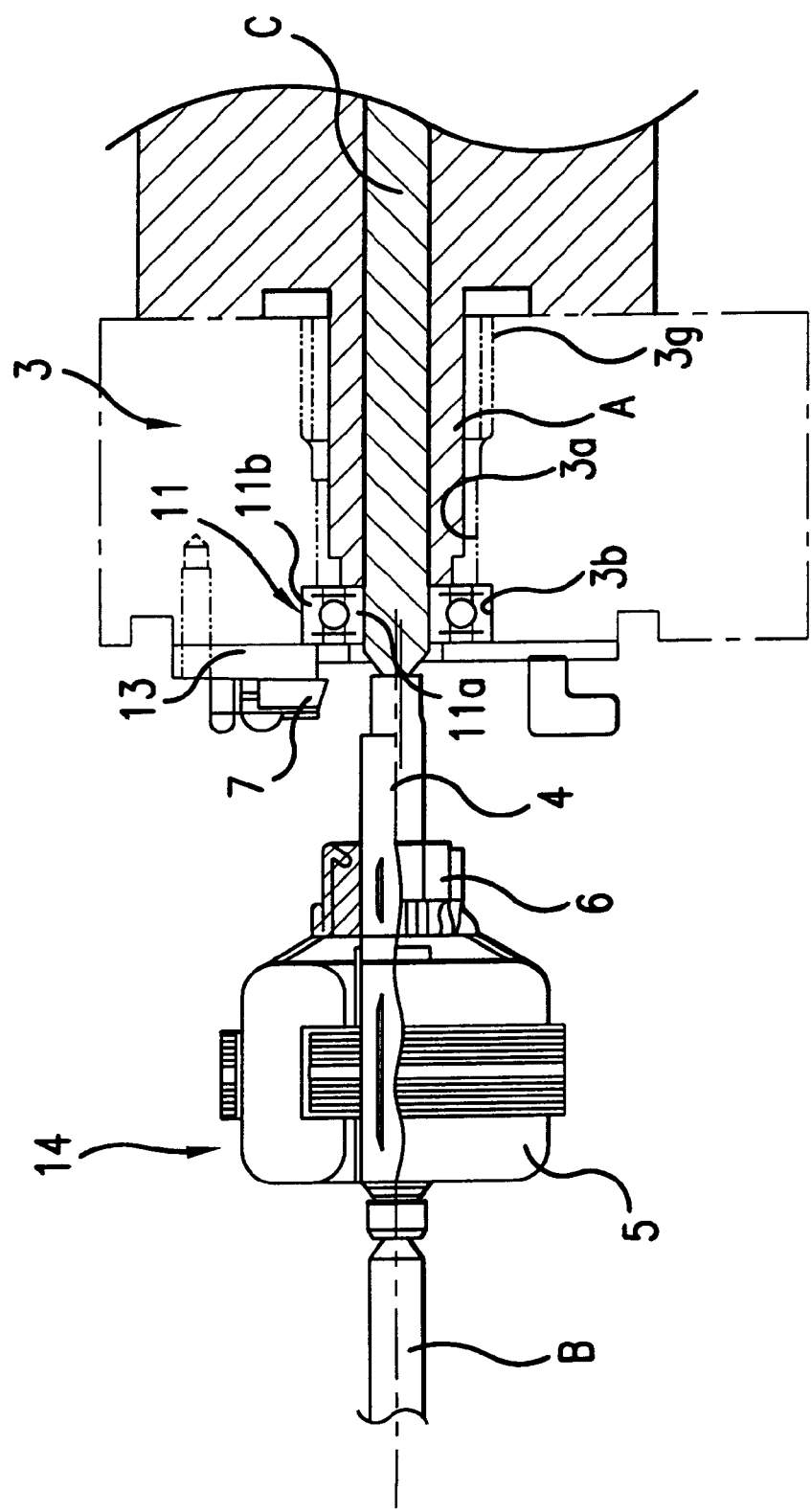
FIG. 3 is a drawing illustrating the assembly steps according to the first embodiment.
Figure 4:
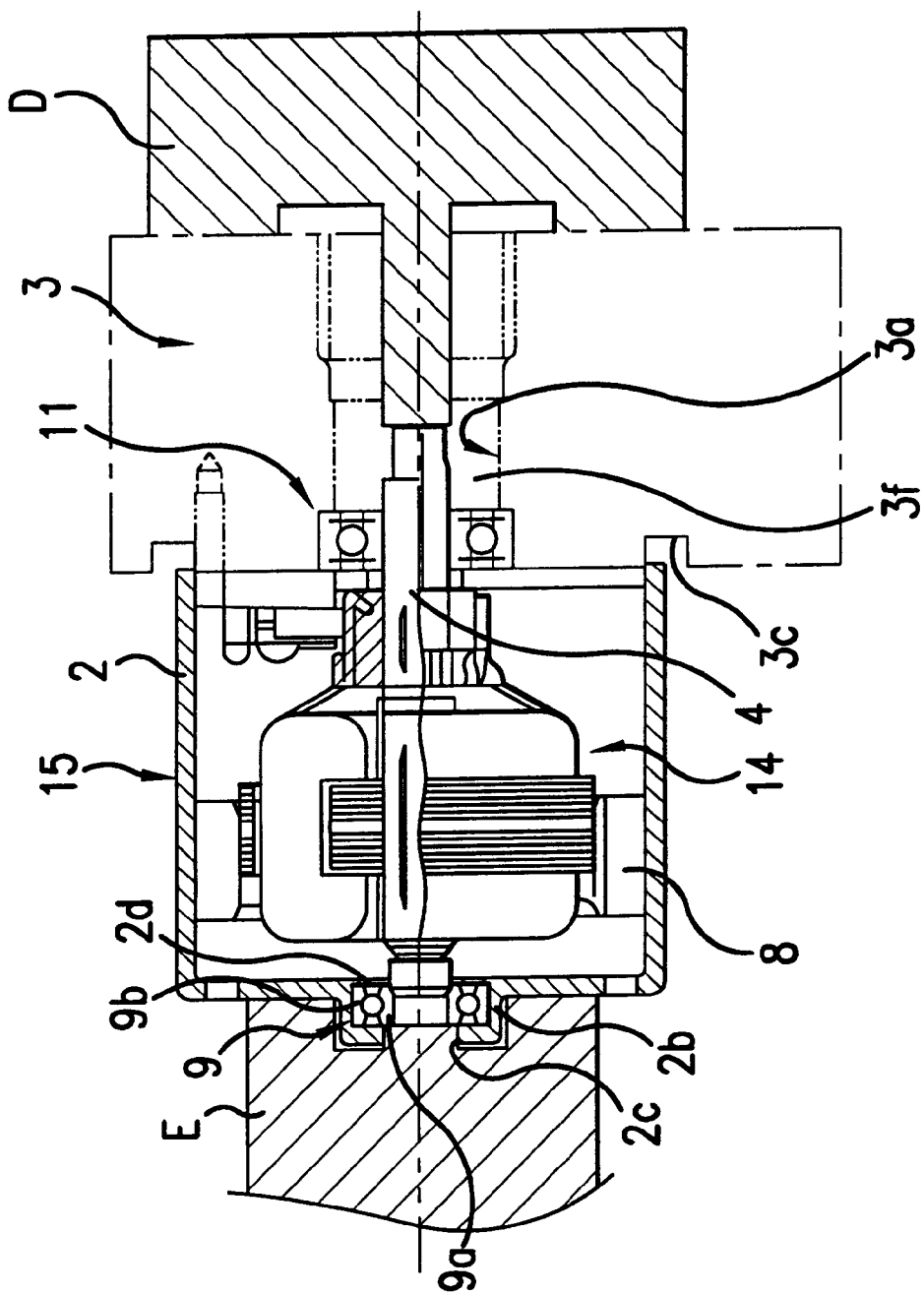
FIG. 4 is a drawing illustrating the assembly steps according to the first embodiment.
Figure 5:
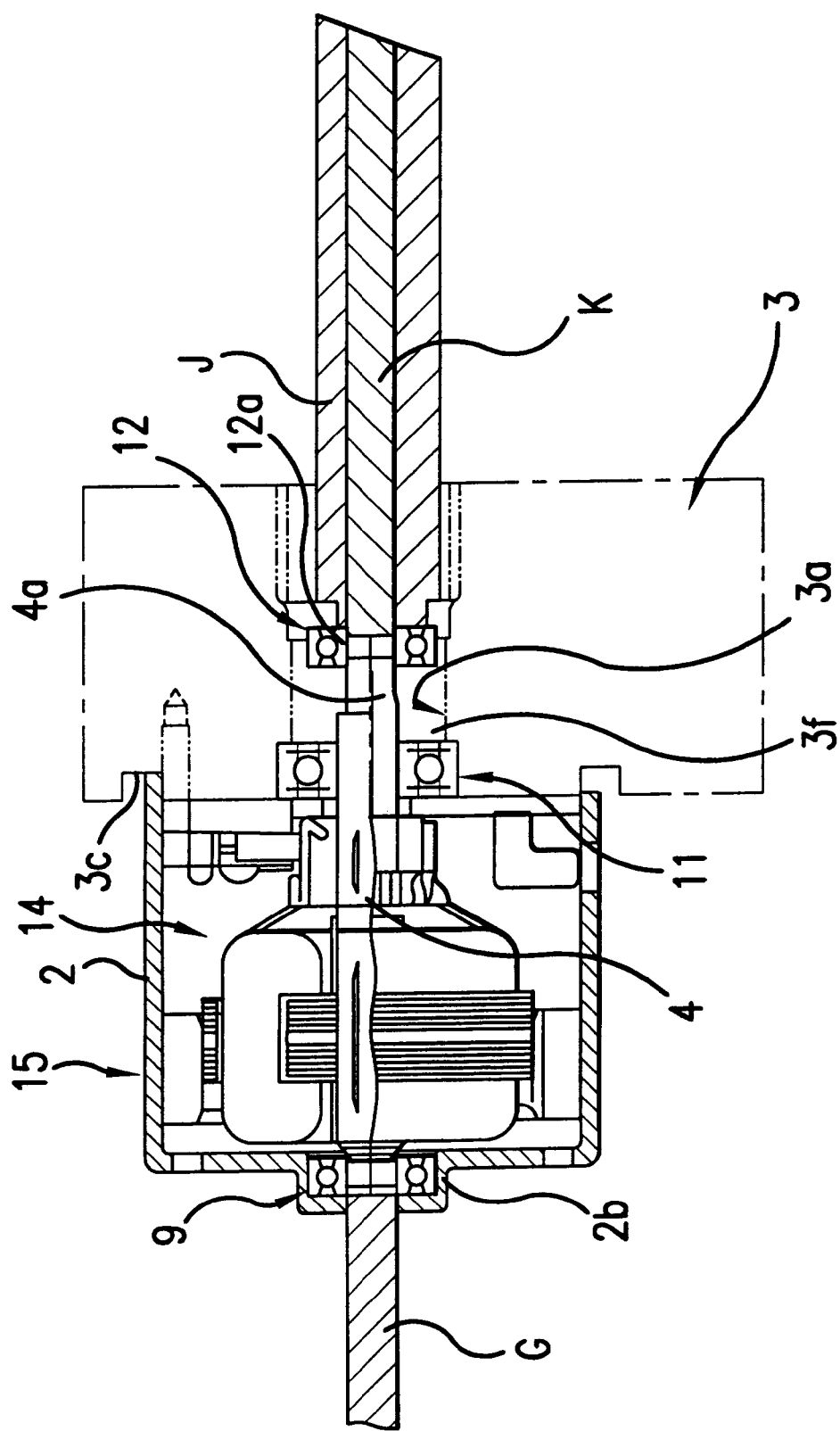
FIG. 5 is a drawing illustrating the assembly steps according to the first embodiment.

FIGS. 3 through 5 show the assembly steps of the electric motor 1. The pump housing inner cylinder 3a comprises a first pump housing bearing supporting portion 3b which fitably supports the first pump housing bearing 11 by press fitting next to the yoke 2. A second pump housing bearing moveable fitting portion 3f is movably fit to the second pump housing bearing 12 and is formed adjacent to the side of the first pump housing bearing supporting portion 3b which is deeper in the cylinder. An inserting hole 3g is formed adjacent to the side of the second pump housing bearing moveable fitting portion 3f so that a jig can be inserted from the side opposite to the side to which the yoke 2 is attached. The outer ring 11b of the first pump housing bearing 11 is then press fit to the first pump housing bearing supporting portion 3b, and subsequently the base unit 13 to which the brush 7 has been assembled is assembled to the yoke assembly side surface of the pump housing 3. Following this, the other side of the armature shaft 4 of the armature assembly 14 comprised of the armature shaft 4, armature core 5, commutator 6, and the like integrally assembled, is press fit using the jigs A, B, and C to the inner ring 11a of the first pump housing bearing 11 which has been assembled to the first pump housing bearing supporting portion 3b. The jigs are inserted from the through hole 3g side (see FIG. 3). Jig A is a jig which is inserted from the side of the pump housing inner cylinder 3a opposite to the side to which the yoke is attached, for supporting the inner ring 11a of the first pump housing bearing 11. Jig B is a jig for applying pressure to the one side of the armature shaft 4, and jig C is a jig for guiding the other side of the armature shaft 4 to the inner ring 11a of the first pump housing bearing.

The outer ring 9b of the yoke bearing 9 is attached to the inner circumference surface of the yoke bottom cylinder portion 2b of the yoke unit 15 with a transition fit (light press fit) or clearance fit. The permanent magnet 8 is fixed beforehand to the inner circumference surface of the yoke 2. The axial direction movement of the yoke bearing outer ring 9b is restricted by applying caulking 2d to the opening edge portion of the bottom cylinder portion 2b. However, no caulking is necessary if the outer ring 9b is attached with a press fit to restrict movement.

Next, the inner ring 9a of the yoke bearing 9 of the yoke unit 15 to which the yoke bearing outer ring 9b has been fit is then press fit to the one end of the armature shaft 4 using jigs D and E (see FIG. 4). The armature shaft 4 is part of the armature assembly 14 assembled to the pump housing 3. Jig D is a jig for supporting the other end of the armature shaft 4 and the pump housing 3. Jig E is a jig for being inserted in the jig inserting hole 2c of the yoke 2 and applying pressure to the yoke bearing inner ring 9a. The press fitting pressure for press fitting the yoke bearing inner ring 9a to the one side of the armature shaft 4 using jig E is set to be equal to or less than the maximum axial load of the yoke bearing 9 and also equal to or greater than the press fitting load of the first pump housing bearing inner ring 11a. This pressure is continually applied until the opening edge surface of the yoke 2 comes into contact at a predetermined pressure with the bottom surface of the groove of the fitting groove 3c formed on the yoke assembly side surface portion of the pump housing 3. The press fitting pressure at this time is set to be equal to or less than the maximum axial load of the yoke bearing 9 and also equal to or greater than the press fitting load of the yoke bearing inner ring 9a.

The fitting groove 3c formed on the pump housing 3 is arranged such that the opening side edge portion of the yoke 2 movably fits into the fitting groove 3c so as to form a spigot-joint fitting arrangement. Thus, even in the event that there is misalignment between the yoke bearing 9 which is attached to the yoke 2 and the first pump housing bearing 11 which is press fit to the pump housing 3, the structure can handle the misalignment due to the spigot-joint fitting arrangement.

Subsequently, the eccentric output shaft portion 4a with the yoke unit 15 assembled thereto is in the position of the second pump housing bearing movable fitting portion 3f. The second pump housing bearing 12 is inserted from the side of the inserting hole 3g and press fit to the eccentric output shaft portion 4a using the jigs G, J, and K, which are also inserted from the side of the inserting hole 3g (see FIG. 5). Jig G is a jig for applying pressure to the one side of the armature shaft 4, jig J is a jig for supporting the second pump housing bearing 12, and Jig K is a jig for guiding insertion of the inner ring 12a of the second pump housing bearing 12 to the eccentric output shaft portion 4a.

Following pressure fitting of the second pump housing bearing 12, through bolts 16 are inserted from the bottom surface portion 2a side of the yoke 2 and are screwed into the screw hole 3d formed in the pump housing 3 and tightened fast. Thus, the yoke 2 is integrally fixed to the pump housing 3.

Also, in the Figures, reference numeral 17 denotes a coupler electrically connected to the external power source side so as to supply electric power to the brush 7. Reference numeral 18 denotes a waterproofing cover which covers the entirety of the yoke 2 so as to provide waterproofing to the electric motor 1. Reference numeral 19 denotes a sealing member which is screwed to the inserting hole 3g of the pump housing inner cylinder portion 3a so as to cover up the hole.

Regarding the arrangement as described above, one end of the armature shaft 4 of the electric motor 1 is rotatably borne by the yoke 2 side with a yoke bearing 9, and the other side thereof is rotatably borne by the pump housing 3 with a first pump housing bearing 11. The inner ring 9a of the yoke bearing 9 is fit to the one side of the armature shaft 4, and the outer ring 9b thereof is attached to the yoke bottom cylinder portion 2b. Also, the inner ring 11a of the first pump housing bearing 11 is press fit to the other side of the armature shaft 4, and the outer ring 11b thereof is press fit to the pump housing first pump housing bearing supporting portion 3b. Any handling of the misalignment between the bearings 9 and 11 is performed by the spigot-joint fitting arrangement between the yoke 2 and the pump housing 3.

As a result, the inner ring 9a of the yoke bearing 9 and the inner and outer rings 11a and 11b of the first pump housing bearing 11 are mounted with a press fit so that even if a heavy load acts on the armature shaft 4 in the radial direction due to the reciprocal movement of the piston which is driven by the motor, the bearings 9 and 11 do not wobble in axial and radial directions, as happens in conventional arrangements. Thus, noise is reduced and pump performance is improved. In conventional arrangements, bearings are often assembled with freedom in the axial direction requiring retaining parts for restricting the axial movement of bearings. In addition, resin material provided to restrict movement of the bearings in the axial and radial directions requires additional processes for inserting the resinous material, which often deteriorates. The disclosed electric motor needs neither retaining parts, nor a resin material for restricting axial movement of the bearings, and thus benefits from a reduction in the number of parts and reduction in the number of processes to manufacture the electric motor.

The disclosed invention is by no means limited to the above-described first embodiment, wherein the yoke bearing outer ring 9b is set to be attached to the yoke bottom cylinder portion 2b with a transition fit, namely a light press fit, a clearance fit, or a through fitting. This arrangement may be press fit, which enables perfect restriction of the movement (rotation). However, when the outer ring 9b is not press fit, the yoke bearing 9 is not a member for supporting the other side of the armature shaft 4 upon which a load from the piston pump acts in a radial direction, but rather is a member for supporting the one side of the armature shaft 4 to the other side. Assembly and processing can be simplified as compared with press fitting.

Figure 6:
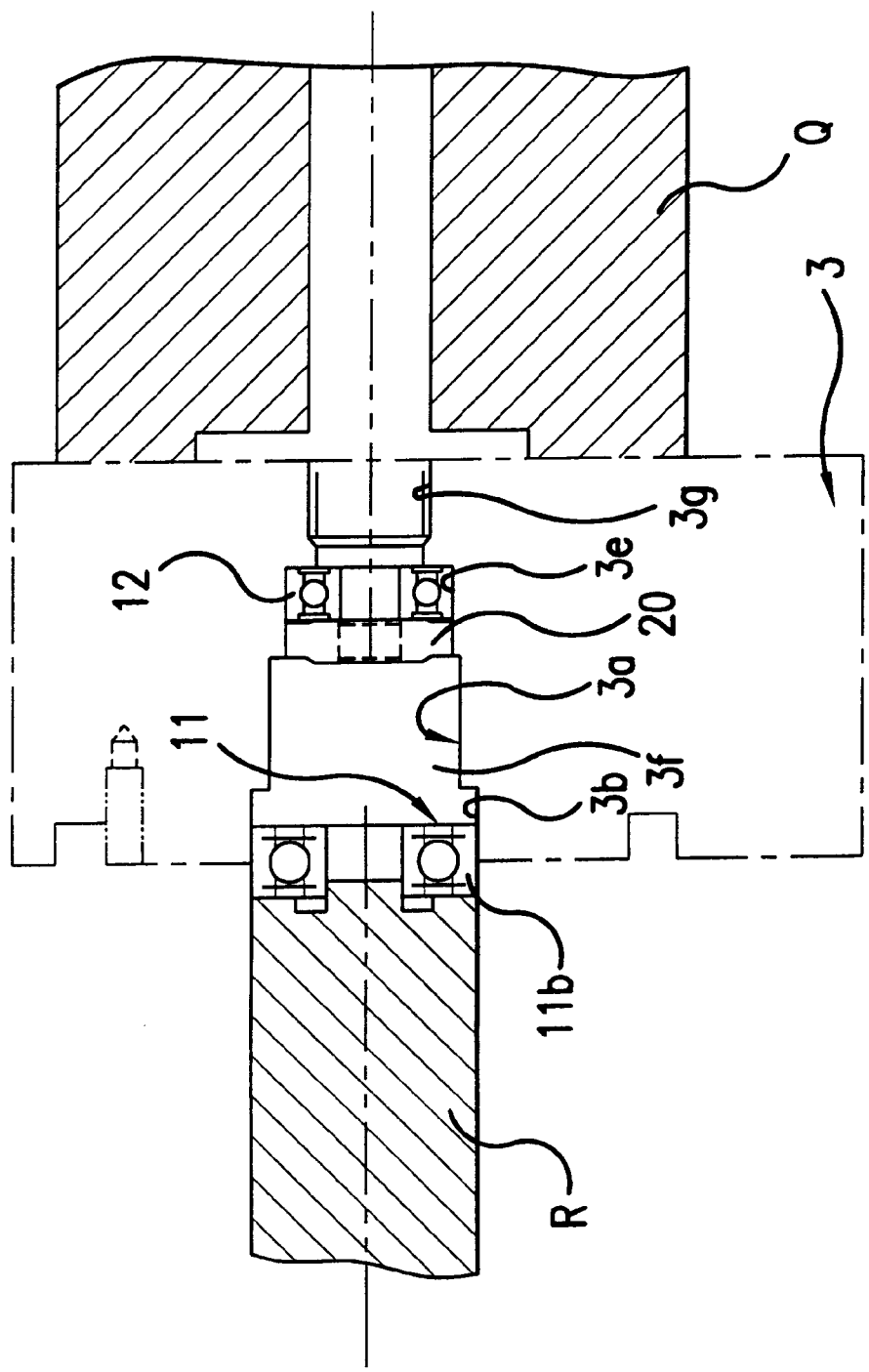
FIG. 6 is a drawing illustrating the assembly steps according to a second embodiment of the invention.
Figure 7:
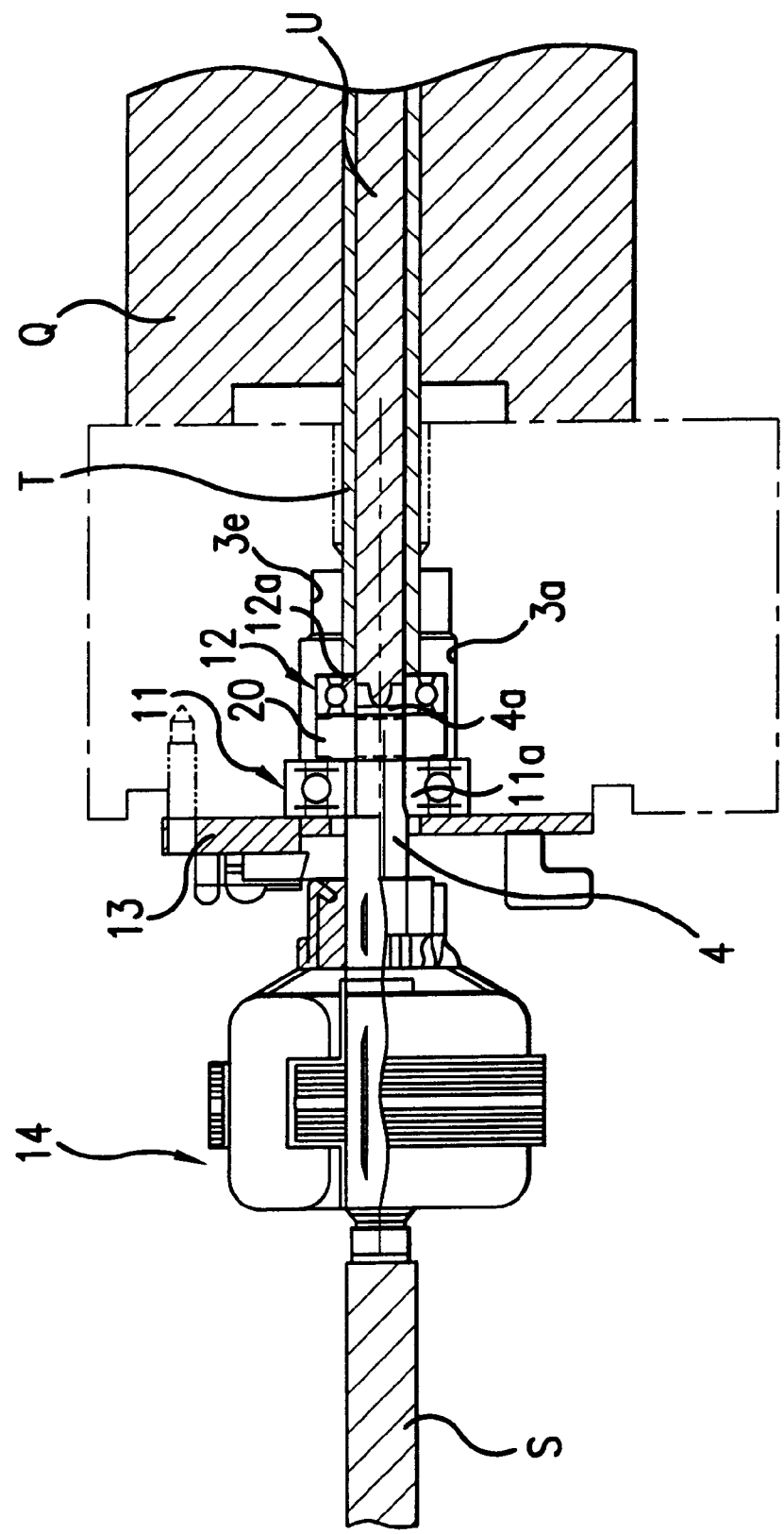
FIG. 7 is a drawing illustrating the assembly steps according to the second embodiment.
Figure 8:
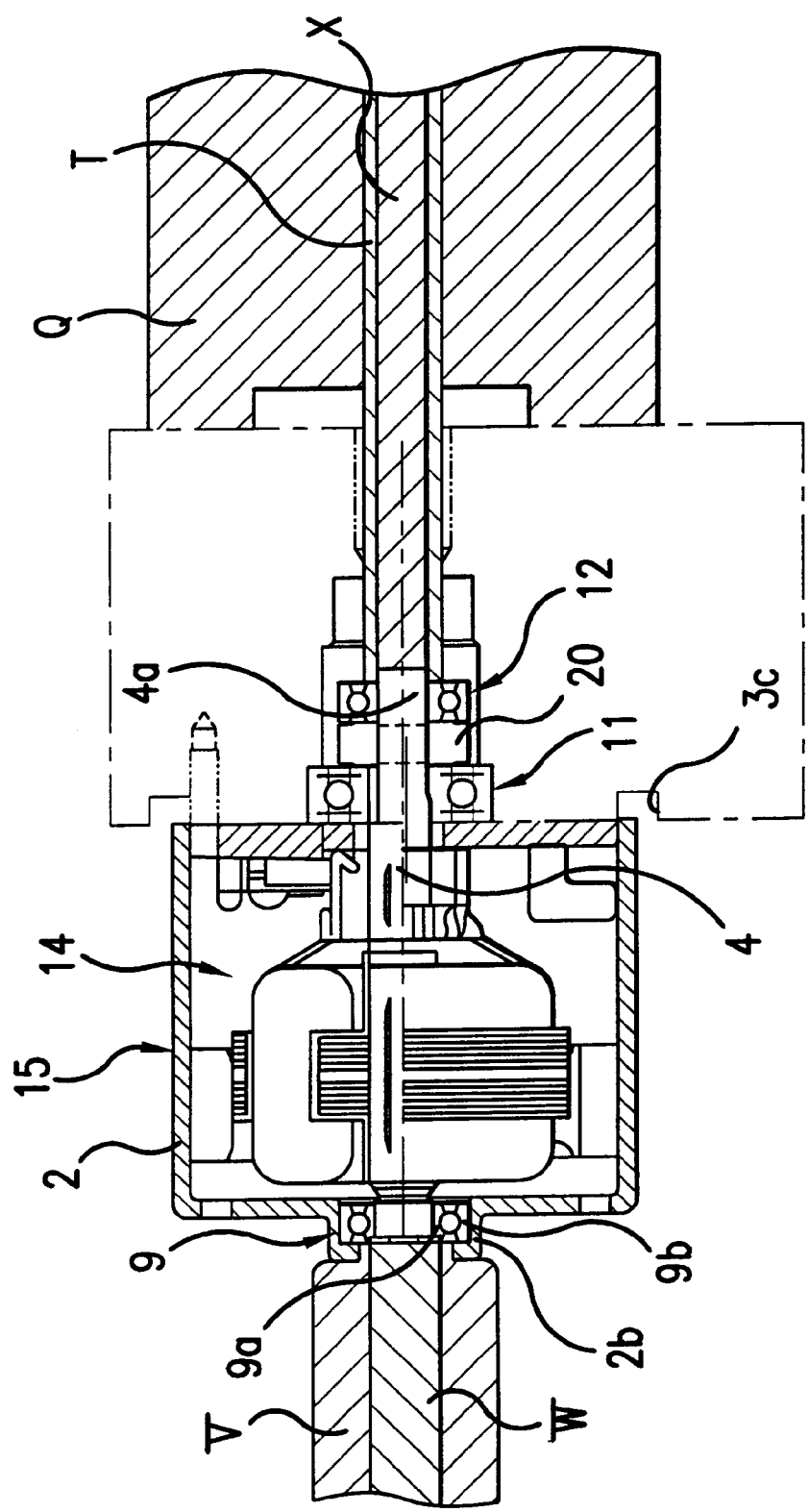
FIG. 8 is a drawing illustrating the assembly steps according to the second embodiment.

A second embodiment of the invention is illustrated in FIGS. 6 through 8. It should be noted that in the following description of the second embodiment, the members which correspond to or are identical to those of the first embodiment are denoted by the same reference numerals.

In the second embodiment, the side opposite to the assembly side of the yoke of the pump housing inner cylinder portion 3a has a small diameter so as to increase freedom of layout of the piston pump components provided within the pump housing 3. According to this structure, the second pump housing bearing 12 cannot be assembled from the side opposite to the side of yoke assembly. In other words, in the interior cylinder portion 3a of the pump housing 3, the following members are sequentially provided from the side of the yoke 2 toward the other side so as to be in adjacent contact in the following order: the first pump housing bearing supporting portion 3b which has the greatest diameter; the second pump housing bearing moveable fitting portion 3f with the next greatest diameter to which the second pump housing bearing 12 is movably fit; the temporary supporting portion 3e with a yet smaller diameter which supports both the second pump housing bearing 12 and the spacer 20, and the inserting hole 3g through which the jig T for applying pressure to the inner ring of the second pump housing bearing 12 is inserted.

The second pump housing bearing 12 and the spacer 20 are inserted from the first pump housing bearing supporting portion 3b side of the internal cylinder portion 3a and assembled to the temporary supporting portion 3e in a temporarily supported manner. The width (thickness) of the spacer 20 is made to be equal to the axial distance between the first pump housing and second pump housing bearings 11 and 12 following assembly of the electric motor 1. Also, the temporary supporting portion 3e is eccentric so as to correspond to the eccentricity of the eccentric output shaft portion 4a. Jig U guides the second pump housing bearing 12 and the spacer 20 to the eccentric output shaft portion 4a.

Next, the first pump housing bearing outer ring 11b is press fit, using jigs Q and R, to the first pump housing bearing supporting portion 3b of the pump housing inner cylinder portion 3a to which has been assembled the second pump housing bearing 12 and the spacer 20 (see FIG. 6). Subsequently, a base unit 13 is assembled thereto. Jig Q is a jig for supporting the pump housing 3, and jig R is a jig for applying pressure to the first pump housing bearing outer ring 11b.

Further, using the jigs Q. S, T and U, the other end of the armature shaft 4 of the armature assembly 14 is press fit to the inner ring 11a of the first pump housing bearing 11 which has been press fit to the pump housing 3, and at the same time, the second pump housing bearing inner ring 12a is press fit to the eccentric output shaft portion 4a. Jig Q is a jig for supporting the pump housing 3 as described above, jig S is a jig for being inserted from the inserting hole 3g and applying pressure to the one end of the armature shaft 4, jig T is a jig for similarly being inserted from the inserting hole 3g and applying pressure to and also supporting the second pump housing bearing inner ring 12a, and jig U is a jig for similarly being inserted from the inserting hole 3g and guiding the spacer 20 and the second pump housing bearing inner ring 12a to the eccentric output shaft portion 4a. First, jig S is used to apply pressure to one end of the armature shaft 4 and insert the other end of the armature shaft 4 into the pump housing inner cylinder portion 3a. At the point immediately before the armature shaft 4 is press fit to the first pump housing bearing inner ring 11a, jig T is used to press fit the spacer 20 and the second pump housing bearing inner ring 12a to the eccentric output shaft portion 4a until the spacer 20 abuts the first pump housing bearing inner ring 11a. Further, when the first pump housing bearing inner ring 11a is supported by jig T with the spacer 20 and the second pump housing bearing 12 being introduced therebetween, pressure is applied to the one end of the armature shaft 4, thus performing press fitting of the other end of the armature shaft 4 to the first pump housing bearing inner ring 11a using jig S (see FIG. 7).

Next, the yoke bearing outer ring 9b is fit to the yoke bottom cylinder portion 2b of the yoke unit 15 and is placed over the armature assembly 14 which has been assembled to the pump housing 3, and the yoke bearing inner ring 9a is press fit to the one end of the armature shaft 4 (see FIG. 8), using the jigs Q, T, V, W, and X. Jig Q is a jig for supporting the pump housing 3, jig T is a jig for supporting the second pump housing bearing inner ring 12a, jig V is a jig for applying pressure to the yoke bearing inner ring 9a, jig W is a jig for supporting the one end of the armature shaft 4, and jig X is a jig for supporting the other end of the armature shaft 4. Assembly according to the above steps allows for the inner ring 9a of the yoke bearing 9 and the inner and outer rings 11a, 11b, 12a, and 12b of the first pump housing and the second pump housing bearings 11 and 12 to be mounted with a press fit without obstruction, even if the construction is such that the side opposite to the side of yoke attachment of the pump housing inner cylinder portion 3a is of such a small diameter that the second pump housing bearing 12 cannot be assembled from the side opposite the yoke attachment. Further, according to this arrangement, due to the construction being such that the side opposite to the side of yoke attachment of the pump housing inner cylinder portion 3a is made to be of a small diameter, the second pump housing bearing 12 cannot be assembled from the side of the inserting hole 3g as with the first embodiment. Accordingly, it is necessary to cause the temporary supporting portion 3e to temporarily support the spacer 20 and the second pump housing bearing inner ring 12a. The diameter of the inserting hole 3g needs only to be of a diameter large enough for temporary insertion of jig T for applying pressure to the inner ring 12b of the second pump housing bearing 12. This arrangement is advantageous in that the distribution space of the piston pump components provided within the pump housing 3 is expanded, resulting in improved freedom in layout.

The invention has been described with reference to the above described preferred embodiments, which are meant to be illustrative, not limiting. Various modifications can be made without departing from the spirit and scope of the invention as defined in the appended claims.

What is claimed is:

1. A method for assembling an electric motor for driving a piston, wherein the electric motor for driving a piston includes:

a yoke including a yoke bearing located at one end of the yoke;

a pump housing connected to other end of the yoke and including a first pump housing bearing located in the pump housing;

an armature shaft extending between the yoke bearing and the first pump housing bearing and including an eccentric shaft tip portion protruding from the first pump housing bearing and receiving a load for driving the piston in a radial direction; and a second pump housing bearing, smaller in diameter than the first pump housing bearing, located on the eccentric shaft tip portion of the armature shaft, the method comprising:

press fitting an outer ring of the first pump housing bearing to the pump housing;

assembling an outer ring of the yoke bearing to the yoke;

press fitting one end of the armature shaft to an inner ring of the yoke bearing;

press fitting the other end of the armature shaft to an inner ring of the first pump housing bearing; thereby bearing the one end of the armature shaft of the electric motor by a yoke with a yoke bearing; and bearing the other end of the armature shaft by a pump housing with a first pump housing bearing.

2. The method of claim 1, wherein the outer ring of the yoke bearing is assembled to the yoke by at least one of a transition fit, light press fit, through fit and a clearance fit.

3. The method of claim 1, further comprising the step of adding a restraint to restrict movement of the outer ring of the yoke bearing in an axial direction.

4. The method of claim 3, wherein the step of adding a restraint includes the step of applying caulking to an opening edge portion of a bottom cylinder portion of the yoke to retain the outer ring of the yoke bearing in the yoke.

5. The method of claim 1, wherein the steps of press fitting the one end of the armature shaft to an inner ring of the yoke bearing and press fitting the other end of the armature shaft to an inner ring of the first pump housing bearing further includes the steps of applying a first predetermined pressure to the inner ring of the yoke bearing using a first jig and applying a second predetermined pressure to the inner ring of the first pump housing bearing using a second jig.

6. The method of claim 1, further comprising the step of forming a spigot-joint fitting arrangement between the pump housing and yoke.

7. The method of claim 1, further comprising press fitting the second pump housing bearing onto the eccentric shaft tip portion protruding from the first pump housing bearing.

8. The method of claim 7, wherein the step of press fitting the second pump housing bearing onto the eccentric shaft tip portion includes:

temporarily supporting the second pump housing bearing within a temporary supporting portion of the pump housing;

inserting a jig from an inserting hole portion formed on a side of the pump housing that is opposite a side to which the yoke is connected;

pressing the jig against an inner ring of the second pump housing bearing which is temporarily supported;

pressing the inner ring of the second pump housing bearing onto the eccentric shaft tip portion of the armature shaft supported by the pump housing with the first pump housing bearing; and fitting moveably the second pump housing bearing into a second pump housing bearing moveable support portion of the pump housing.

* * * * *